United States Patent [19]
Nomoto

[11] Patent Number: 5,357,499
[45] Date of Patent: Oct. 18, 1994

[54] OPTICAL DISK AND OPTICAL DISK REPRODUCING APPARATUS

[75] Inventor: Takayuki Nomoto, Tokorozawa, Japan

[73] Assignee: Pioneer Electronic Corporation, Tokyo, Japan

[21] Appl. No.: 975,468

[22] Filed: Nov. 12, 1992

[30] Foreign Application Priority Data

Jan. 20, 1992 [JP] Japan .................................. 4-007839

[51] Int. Cl.$^5$ .......................... G11B 7/13; G11B 7/007
[52] U.S. Cl. .................................. 369/120; 369/275.4
[58] Field of Search ........................... 369/275.4, 120

[56] References Cited

U.S. PATENT DOCUMENTS

| | | | |
|---|---|---|---|
| 4,310,916 | 1/1982 | Dil | 369/109 |
| 4,325,135 | 4/1982 | Dil et al. | 369/110 |
| 5,170,390 | 12/1992 | Ohta et al. | 369/288 |
| 5,200,941 | 4/1993 | Matoba et al. | 369/44.26 |

FOREIGN PATENT DOCUMENTS 0137241 6/1986 Japan ............................ G11B 7/24

Primary Examiner—Paul M. Dzierzynski
Assistant Examiner—David V. Bruce
Attorney, Agent, or Firm—Sughrue, Mion, Zinn, Macpeak & Seas

[57] ABSTRACT

An optical disk has: a substrate of disk shape; a recording medium formed on the substrate, and having a recording surface on which a plurality of tracks are formed; and information pits formed on the tracks. Each of the information pits has a first pit portion having a first level from the recording surface and a second pit portion having a second level lower than the first level. A pit direction angle indicating an angle between a direction connecting the first pit portion and the second pit portion to each other and a circular direction of the optical disk, is equal to one of predetermined equiangular angles around the center of the information pit. The pit direction angle corresponding to recorded information pieces read by projecting a laser beam onto the recording medium.

13 Claims, 23 Drawing Sheets

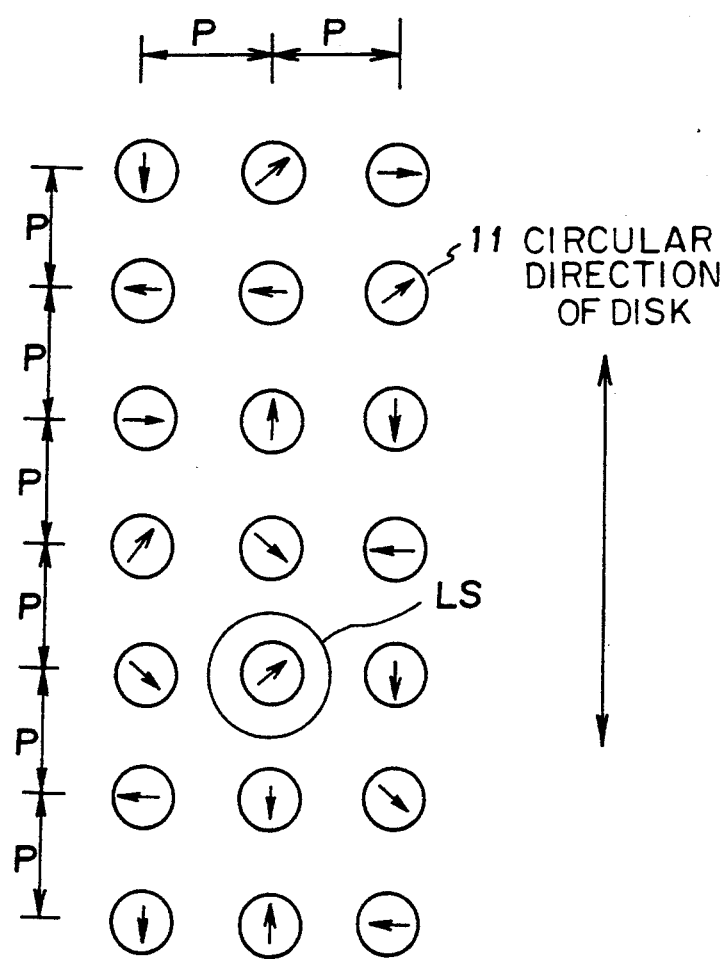

F I G. 12
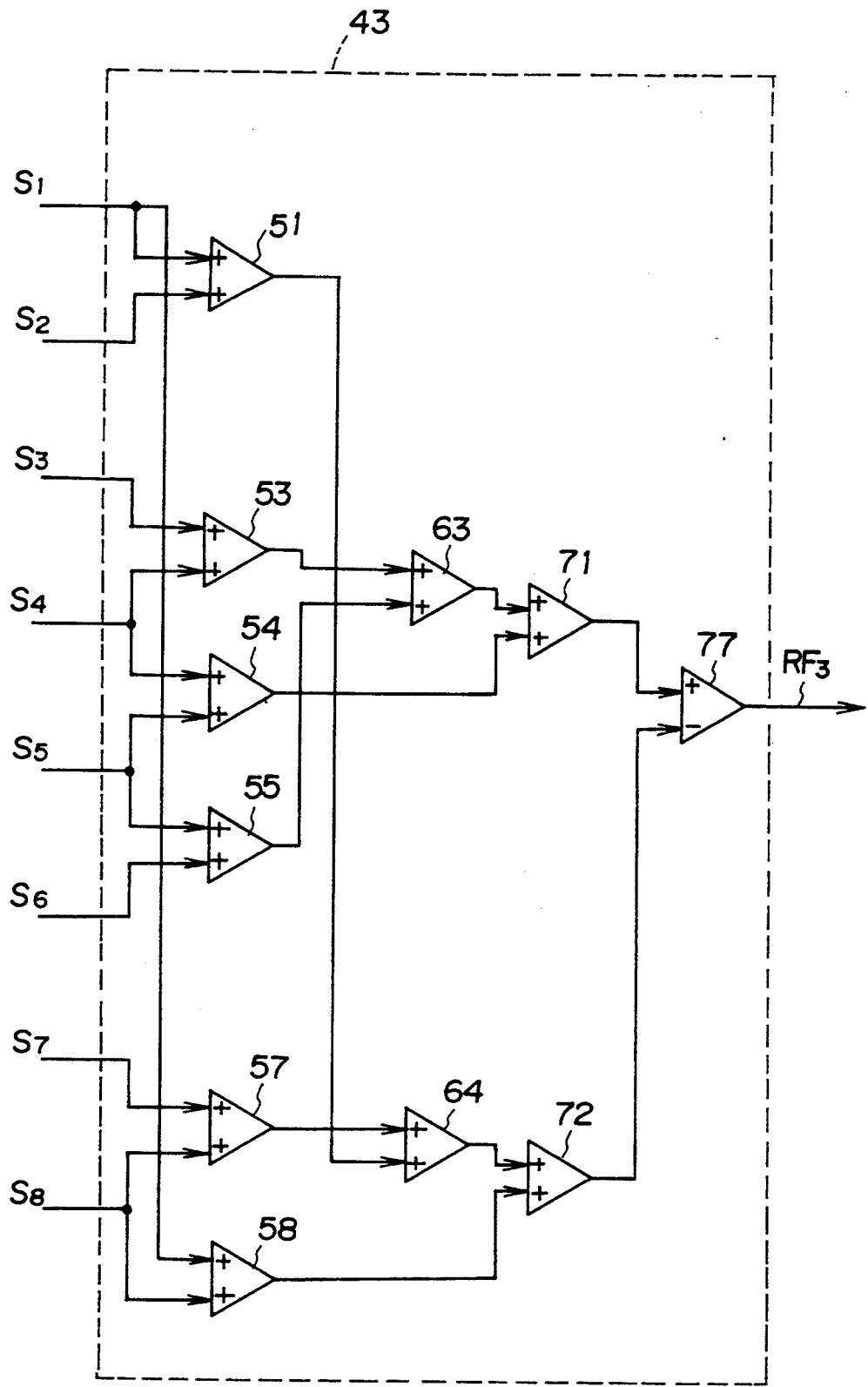

F I G. 20
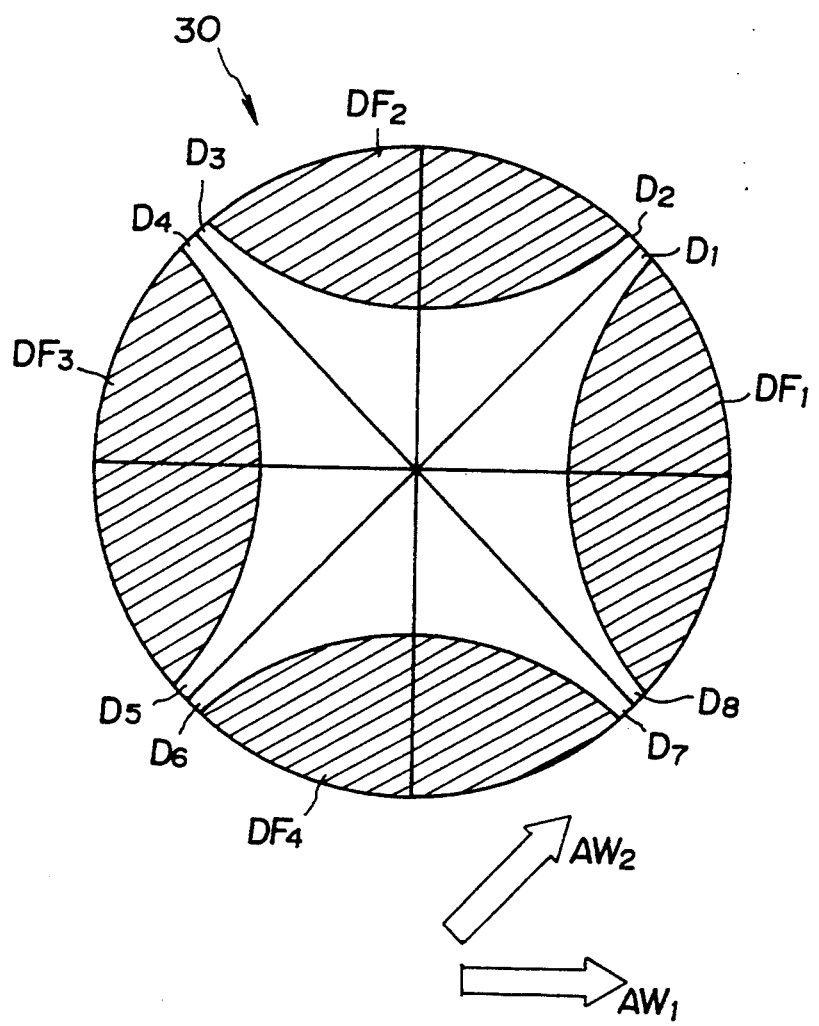

RADIAL DIRECTION OF DISK

CIRCULAR DIRECTION OF DISK

OPTICAL DISK AND OPTICAL DISK REPRODUCING APPARATUS

BACKGROUND OF THE INVENTION

1. Field of the Invention

The present invention relates to an optical disk and an optical disk reproducing apparatus.

2. Description of the Related Art

FIG. 1 shows a part of an optical disk 2. The optical disk 2 has a substrate 3 having an information recording surface 5, and a protection layer 4 covering the information recording surface 5. A plurality of information pits 1, which have lengths modulated by recording information, are recorded on the information recording surface 5. During an information reproducing operation, a laser beam is projected onto one of the information pits 1 so that a laser beam spot LS having a predetermined diameter is formed on the information recording surface 5. A diffracted and reflected light is detected by a photodetector formed with, for example, a photodiode. The photodetector converts the received light into an electric signal. Information, such as audio information and video information, is extracted from the electric signal by means of a signal conversion process, which is the reverse of a signal conversion process for recording information. Examples of optical disks as described above are compact disks (CD) and laser video disks (LVD).

As shown in FIG. 2, the information recording density of optical disks greatly depends on the value of a track pitch P3 and the diameter of the laser beam spot LS projected onto the information pit 1. The track pitch P is the distance between the center lines of adjacent pit strings, that is, tracks. Hence, it is important to reduce the track pitch P in order to increase the information recording density.

In the cases as shown in FIGS. 1 and 2, there is no problem. However, as shown in FIG. 3, if the track pitch is set to a value P4 smaller than the value P3 in FIG. 2, to a certain extent (for example, P4=P3/2), information pit 1B or 1C on the adjacent track is concurrently included within the laser beam spot LS which is scanning an information pit 1A. In this case, a large quantity of crosstalk occurs, and hence the optical disk shown in FIG. 3 is not suitable for practical use.

In order to increase the information recording density, it may be effective to diminish the size of the laser beam spot LS. As shown in FIG. 4, the minimum beam diameter w obtained by focusing, by means of an objective lens OL, a laser beam having a wavelength $\lambda$ at a position corresponding to a focusing distance f of the objective lens OL is expressed as follows:

$$w = 1.22 \times (\lambda / NA) \quad (1)$$

where NA denotes a numerical aperture of the objective lens OL. The numerical aperture NA is defined as follows:

$$NA = n \times \sin \theta \quad (2)$$

where n denotes the refractive index of the objective lens OL, and $\theta$ is the angle of emergence from the objective lens OL. Hence, in order to reduce the diameter w of the laser beam spot LS, it is necessary to reduce the wavelength $\lambda$ or increase the numerical aperture NA. The wavelength $\lambda$ of a semiconductor laser used for optical disks is approximately equal to 0.780 $\mu$m (the $\mu$m is equal to $1 \times 10^{-6}$ m). The numerical aperture NA for compact disks is approximately equal to 0.45. Hence, the diameter w of the laser beam spot LS is approximated as follows:

$$wmin = 1.22 \times (0.780/0.45) = 2.1 \ (\mu m).$$

As a result, the minimum track pitch which does not result in crosstalk when the laser beam spot LS is projected onto a pit string is approximately equal to 1.6 $\mu$m, and optical disks employ this value of the minimum track pitch.

SUMMARY OF THE INVENTION

It is therefore an object of the present invention to provide an optical disk and an optical disk reproducing apparatus employing a reduced track pitch value.

According to the present invention, the above mentioned object can be achieved by an optical disk having an information recording surface from which information is read by projecting a laser beam having a predetermined wavelength with a predetermined numerical aperture and by utilizing a diffraction and reflection function of the laser beam. A plurality of turns of a track are spirally formed on the information recording surface. Adjacent turns of the track, that is, adjacent tracks are spaced apart from each other with a predetermined track pitch. The optical disk of the present invention has: a substrate of disk shape; a recording medium formed on the substrate, and having a recording surface on which a plurality of tracks are formed; and information pits formed on the tracks. Each of the information pits has a first pit portion having a first level from the recording surface and a second pit portion having a second level lower than the first level. A pit direction angle indicating an angle between a direction connecting the first pit portion and the second pit portion to each other and a circular direction of the optical disk, is equal to one of predetermined equiangular angles around the center of the information pit. The pit direction angle corresponding to recorded information pieces read by projecting a laser beam onto the recording medium.

According to the present invention, the above mentioned object can be also achieved by an optical disk reproducing apparatus for reproducing information from the above mentioned optical disk of the present invention. The optical disk reproducing apparatus has: a light projection device for projecting a laser beam having a predetermined wavelength onto the recording surface under a condition of a predetermined numerical aperture; a photodetector device having equiangular light receiving surfaces, for generating light detection signals from a reflected laser beam reflected by the recording surface and incident on the equiangular light receiving surfaces, one of dividing lines for dividing an entire light receiving surface of the photodetector device being substantially parallel to the circular direction of the optical disk; an optical system having a light path in which the reflected laser beam projected onto a center line of the track is received in a center portion of the entire light receiving surface; an operation device, coupled to the photodetector device, for generating information signals as predetermined functions of the light detection signals from the light receiving surfaces; and an information reproducing device, coupled to the operation device, for reproducing information recorded on the optical disk from the information signals.

In one aspect of the present invention, the pit direction angle of the optical disk is equal to one of 0°, 45°, 90°, 135°, 180°, 225°, 270° and 315°. In this case, the optical disk reproducing apparatus is preferably constructed as following. Namely, the photodetector device has eight light receiving surfaces. The operation device is adapted to generate information signals RFn in accordance with the following expression:

$$RF_n = S_n + 2 \times S_{n+1} + 2 \times S_{n+2} + S_{n+3} - (S_{n+4} + 2 \times S_{n+5} + 2 \times S_{n+6} + S_{n+7}) \qquad (3)$$

where $S_n$ (n=1, 2, ..., 8) denotes one of the light detection signals from an nth light receiving surface of the eight light receiving surfaces. The information reproducing device is adapted to reproduce the information recorded on the optical disk from the information signals RFn.

In a case where the wavelength λ of the laser beam and the numerical aperture NA are selected so that two diffracted lights overlap each other on the light receiving surface of the photodetector unit (for example, as shown in FIG. 19), light intensities $I_1$–$I_4$ respectively obtained in diffracted light overlapping areas $DF_1$–$DF_4$ satisfy the following relations when the direction of a slope of the information pit corresponds to a direction indicated by arrow $AW_1$:

$$I_1 > I_2, I_4 > I_3 \qquad (4)$$

The above light intensities are calculated using a basic expression of a scaler theory regarding read signals of optical disks, proposed by H. H. Hopkins (see H. H. Hopkins, "Diffraction theory of laser read-out systems for optical video discs", Journal of the Optical Society of America, Vol. 69, No. 1, January 1979, or "Optical disk systems", The Institute of Applied Physics in Japan, edited by the round-table conference, pp. 45-50). When the direction of the slope (which corresponds to a direction indicated by arrow $AW_2$ shown in FIG. 19, for example), the following relations are obtained:

$$I_1, I_2 > I_3, I_4 \qquad (5)$$

With the above in mind, an information pit having a height difference or a slope (for example, as shown in FIGS. 6, 21A or 22A), is used and light diffracted and reflected by such an information pit is received by an eight-divided photodetector having eight divided light receiving surfaces (for example, D1 to D8 shown in FIG. 9). Then, the aforementioned information signal RFn is calculated for each of the light detection signals S1, S2, S3, S4, S5, S6, S7 and S8 by using the following expression (which is the same as the expression (3)):

$$RFn = Sn + 2 \times Sn + 1 + 2 \times Sn + 2 + Sn + 3 - (Sn + 4 + 2 \times Sn + 5 + 2 \times Sn + 6 + Sn + 7) \qquad (6)$$

In this manner, the eight pit slope directions can be detected with a sufficient SN ratio (signal-to-noise ratio). Hence, it becomes possible to reduce unit lengths (pitches) P, P1 and P2 (as shown in FIGS. 7, 21B and 22B, for example) to a value causing two diffracted lights to overlap each other. This means an increase in the quantity of information per a unit area.

As discussed above, a reduced track pitch value can be employed, by the optical disk and the optical disk reproducing apparatus of the present invention, under a condition in which even the currently available laser beam wavelength and the currently available numerical aperture are used.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 7 is a diagram showing a track pitch and the distance between adjacent pits in the first embodiment of the present invention;

FIG. 12 is a block diagram of an information signal operation unit 43 shown in FIG. 9;

FIG. 20 is another diagram showing the operation of the first embodiment of the present invention;

DESCRIPTION OF THE PREFERRED EMBODIMENTS

A description will now be given, with reference to FIGS. 5A, 5B, 6A, 6B, 6C and 7, of a compact disk according to a first embodiment of the present invention.

Figure 1:
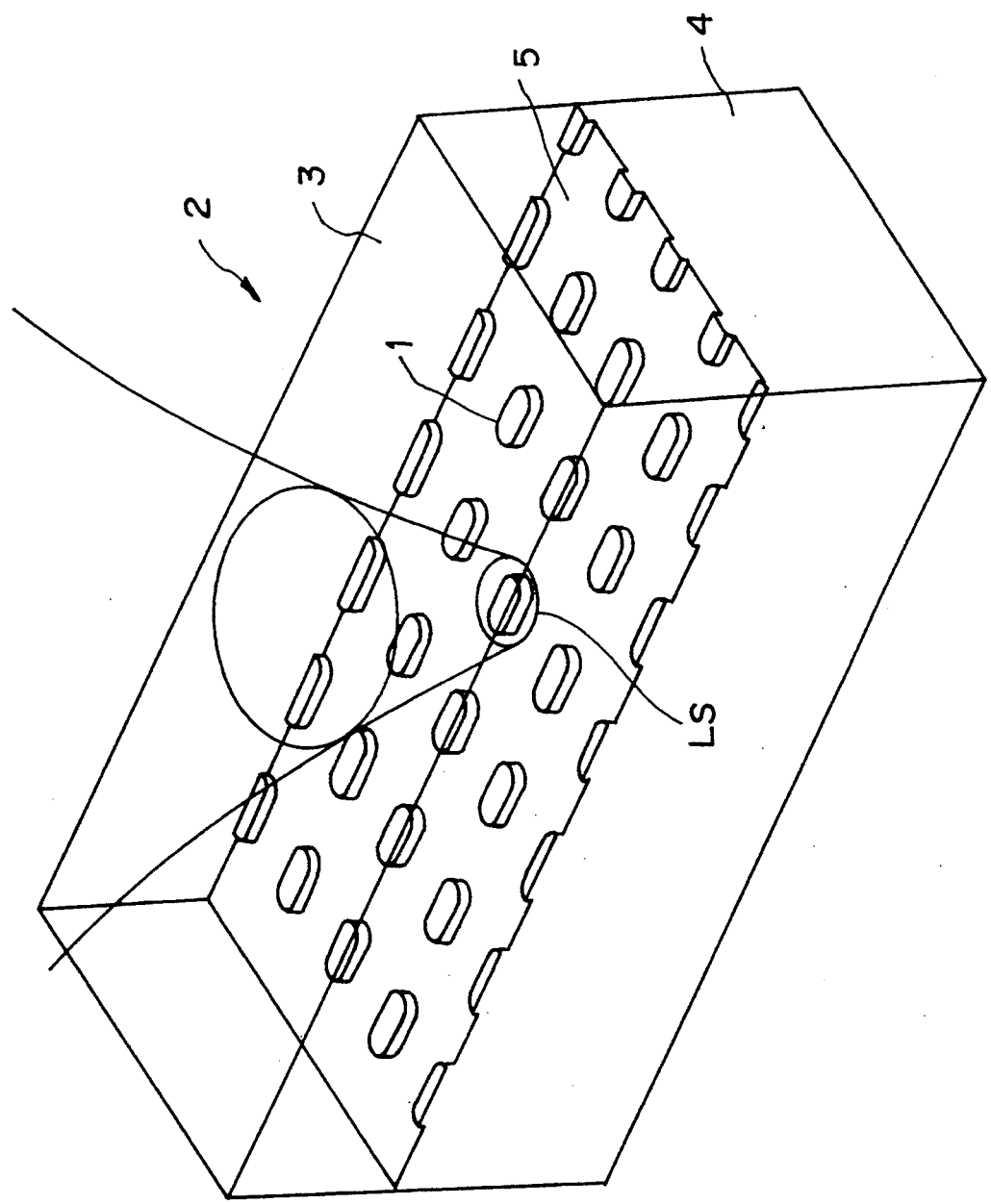
FIG. 1 is a perspective view of the structure of an optical disk.
Figure 2:
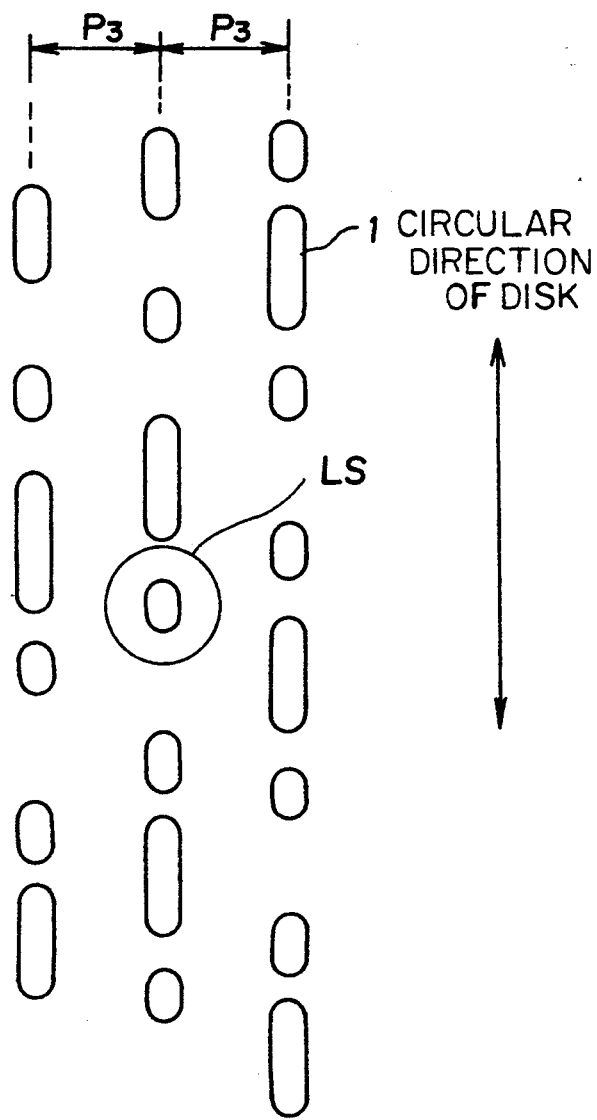
FIG. 2 is a diagram showing a track pitch of an optical disk.
Figure 3:
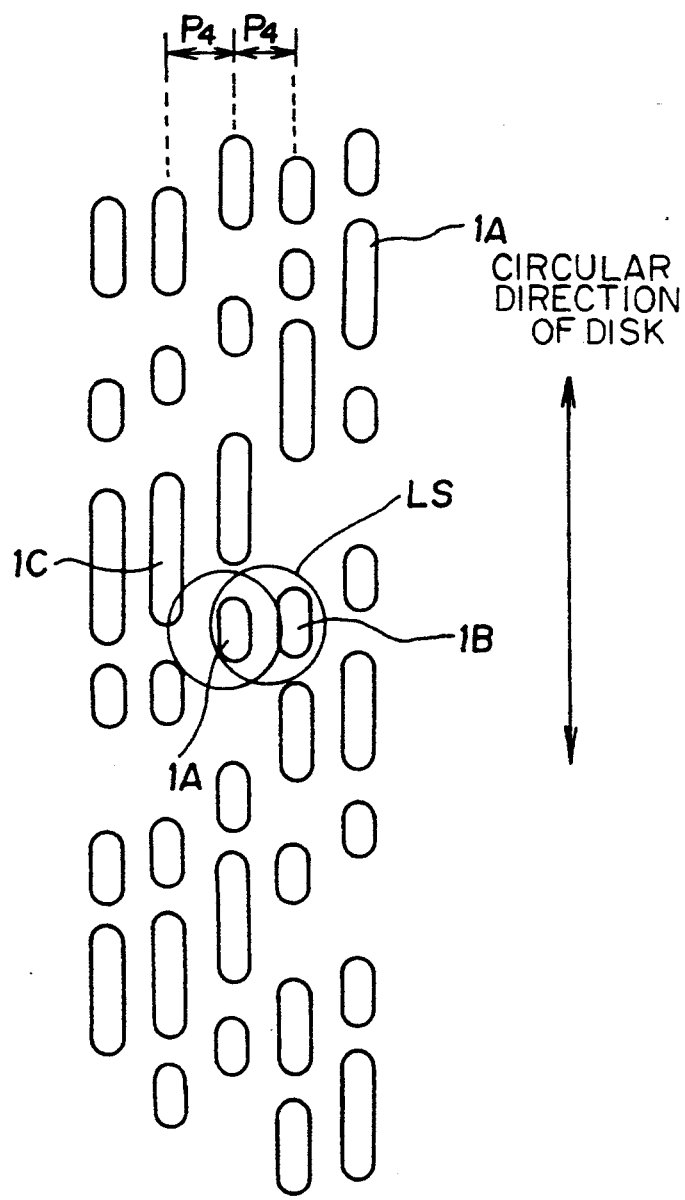
FIG. 3 is a diagram showing a track pitch obtained by solely reducing the track pitch to half of the optical disk of FIG. 2.
Figure 4:
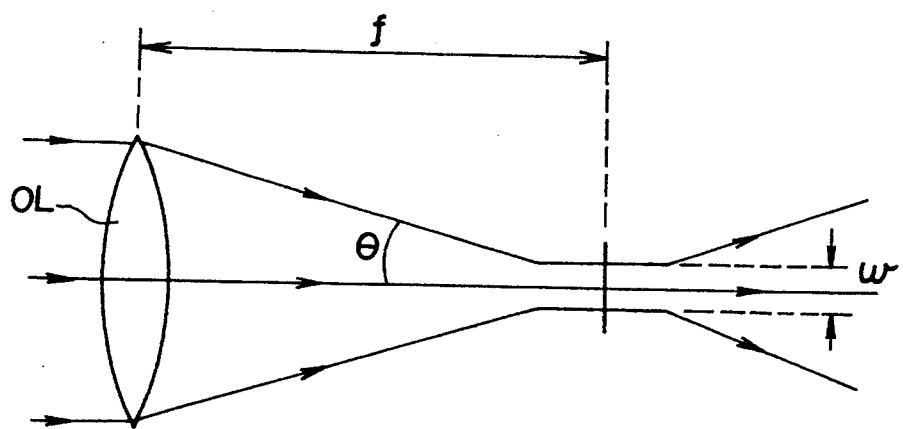
FIG. 4 is a diagram showing a relation between an objective lens and a laser spot in an optical disk.
Figure 5A:
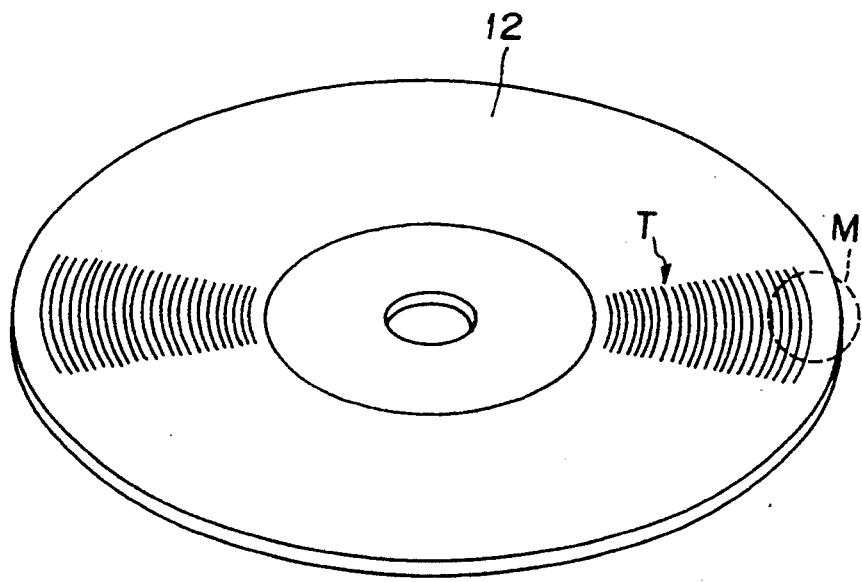
FIGS. 5A and 5B are diagrams showing an overview of an optical disk according to a first embodiment of the present invention.
Figure 5B:
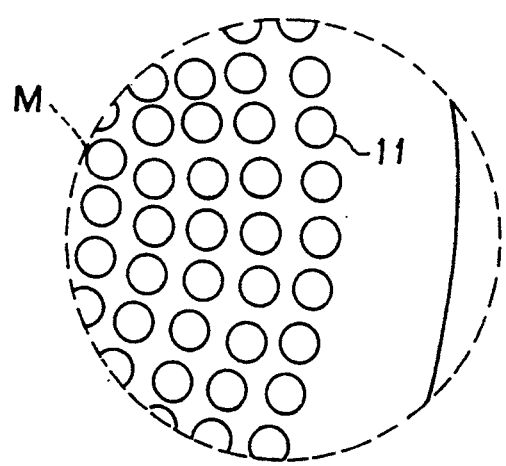

FIG. 5A shows an external appearance of a compact disk 12. As shown in FIG. 5A, a track T is spirally formed on the compact disk 12 so that the track T extends from an inner portion of the compact disk 12 to an external portion thereof. FIG. 5B is an enlarged view of a portion M of the compact disk 12 shown in FIG. 5A. A reference number 11 indicates an information pit.

Figure 6A:
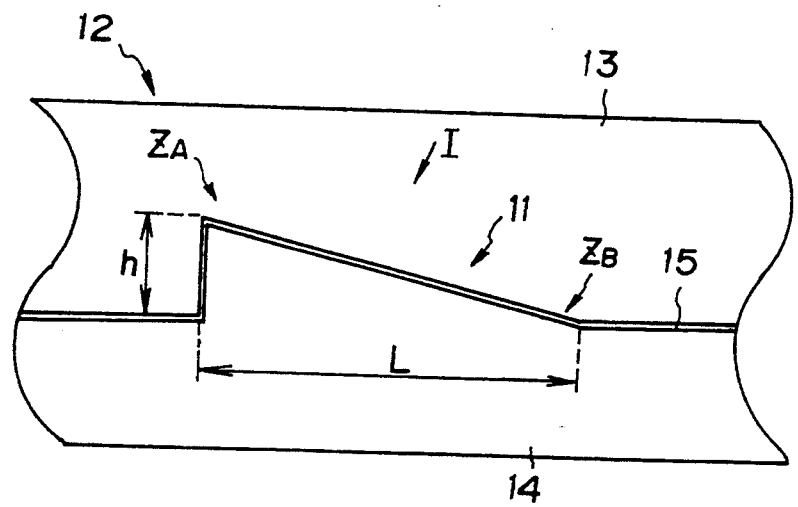
FIGS. 6A, 6B and 6C are diagrams showing the details of the optical disk according to the first embodiment of the present invention.
Figure 6B:
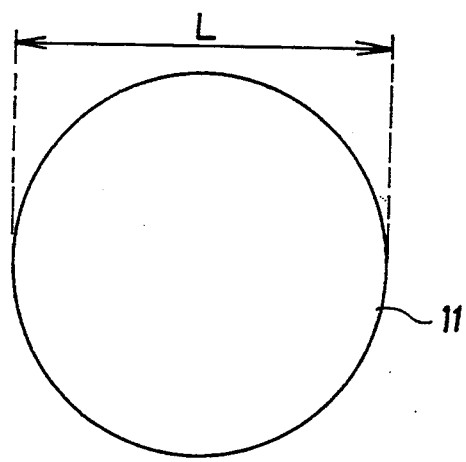

As shown in FIG. 6A, which is a cross-sectional view of a part of the compact disk 12, the compact disk 12 has a protection layer 14, an information recording surface 15, and a transparent substrate 13. The protection layer 14 has a surface on which a pit facing upwardly is formed. The information recording surface 15, which is formed with a metallic evaporation film made of, for example, aluminum, covers the pit and a flat surface (land portion) of the protection layer 16. The transparent substrate 13 is made of polycarbonate resin having a refractive index n. A projection 11 formed by the metallic evaporation film functions as an information pit. As shown in FIGS. 6A and 6B, the information pit 11 has a slope having a diameter L and a height h from the flat surface of the protection layer 14. That is, the information pit 11 is just like a shape obtained by obliquely cutting off a cylinder. The optical height of the information pit 11 is equal to n×h.

Figure 6C:
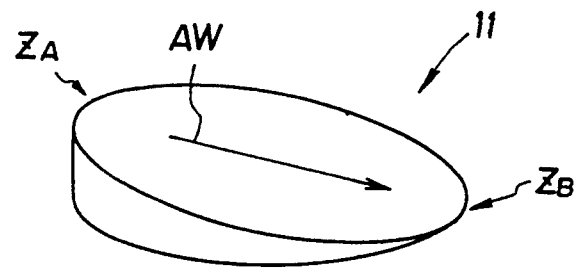

FIG. 6C is a perspective view of the information pit 11 obtained by viewing it in a direction I shown in FIG. 6A. An arrow AW shown in FIG. 6C indicates the direction of the slope. A reference $Z_A$ indicates a high pit portion, and reference $Z_B$ indicates a low pit portion.

FIG. 7 shows a track pitch of the compact disk 12. The track pitch which is the difference between two adjacent tracks is equal to P, and the distance between adjacent information pits arranged side by side in the circular direction of the compact disk 12 is also equal to P. Arrows depicted in circles representing the information pits 11, indicate the directions AW of the respective slopes. The arrows AW also indicate the directions of steps of the respective information pits 11, each having the height h. Each of the information pits 11 has one of pit direction angles equal to 0°, 45°, 90°, 135°, 180°, 225°, 270° and 315°. Hence, the eight possible direction angles of the information pits 11 respectively express 3-bit information ($8=2^3$).

Figure 8:
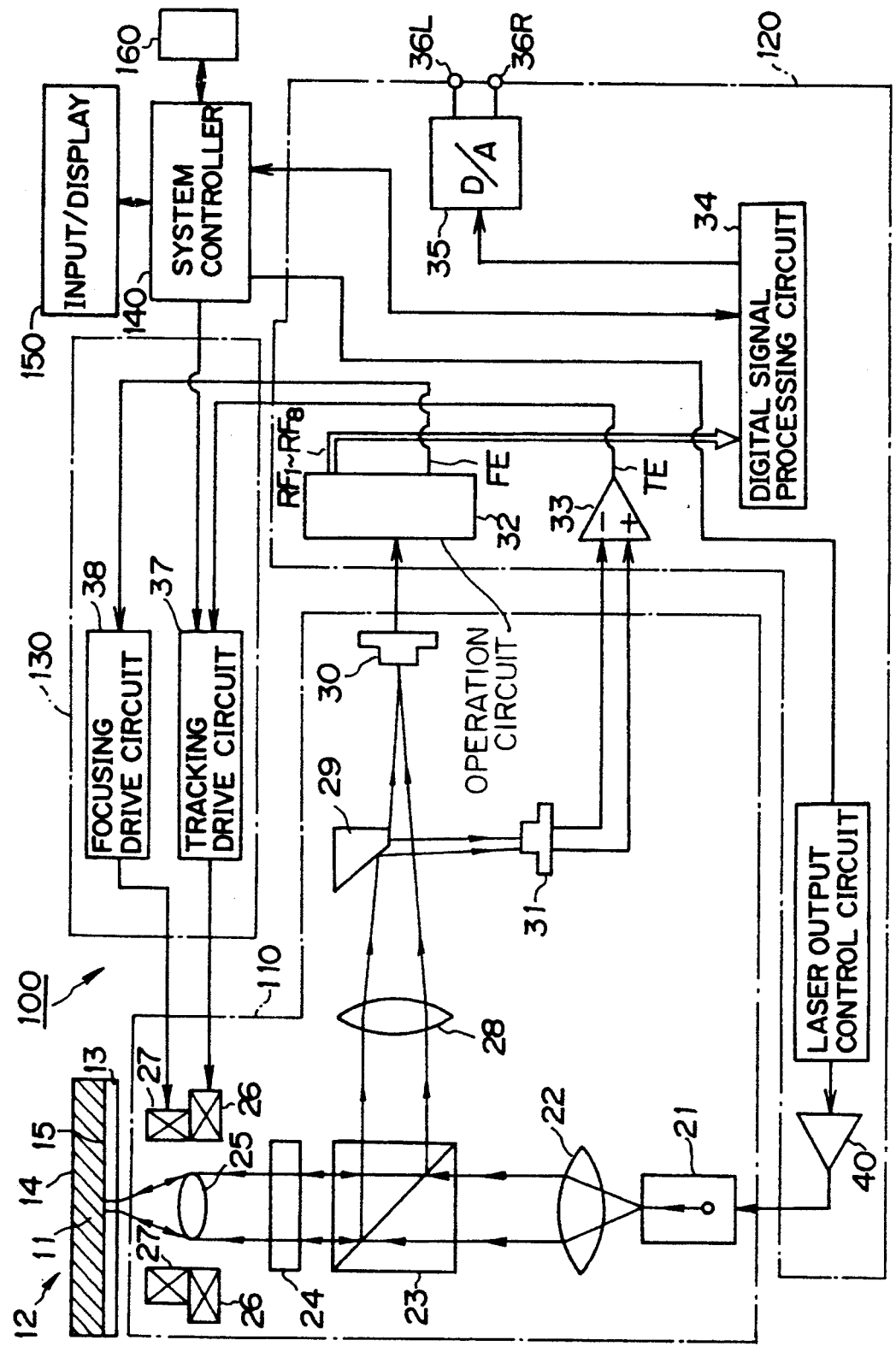
FIG. 8 is a block diagram of a compact disk player according to a second embodiment of the present invention.

A description will now be given, with reference to FIG. 8, of a compact disk player according to a second embodiment of the present invention. A compact disk player 100 shown in FIG. 8 has an optical pickup 110, a signal processing unit 120, a pickup controller 130, a system controller 140, an input/display unit 150, and a memory unit 160. The optical pickup 110 reads information from the compact disk 12. The signal processing unit 120 processes the signal read by the optical pickup 110. The pickup controller 130 controls the optical pickup 110. The system controller 140 controls the entire operation of the compact disk player 100.

The optical pickup 110 has a semiconductor laser 21, a collimator lens 22, a beam splitter 23, a quarter-wave plate 24, an objective lens 25, a convergent lens 28, a prism mirror 29, an eight-divided photodetector 30, and a two-divided photodetector 31. The semiconductor laser 21 emits a laser beam. The collimator lens 22 collimates the laser beam emitted from the semiconductor laser 21. The beam splitter 23 allows the collimated laser beam to pass. The quarter-wave plate 24 introduces a phase difference of one-quarter cycle to the collimated beam from the beam splitter 23. The objective lens 25 focuses the laser beam from the quarter-wave plate 24 on the information recording surface 15 of the compact disk 12. The laser beam is reflected by the reflection film i.e. the recording surface 15 of the compact disk 12 and passes again through the objective lens 25 and the quarter-wave plate 24. Then, the laser beam is reflected by a reflection surface of the beam splitter 23 so that the light path is bent at a right angle. The convergent lens 28 converges the laser beam from the beam splitter 23. The prism mirror 29 guides the laser beam from the convergent lens 28 to the eight-divided photodetector 30 and the two-divided photodetector 31. The eight-divided photodetector 30 receives the laser beam from the prism mirror 29, and the two-divided photodetector 31 receives the laser beam branching at the prism mirror 29.

The signal processing unit 120 has an operation circuit 32, a subtracter 33, a digital signal processing circuit 34, a D/A converter 35, output terminals 36L and 36R, a laser output control circuit 39, and a semiconductor laser driving circuit 40. The operation circuit 32 receives output signals of the eight-divided photodetector 30, and executes a predetermined operation on the received output signals. The subtracter 33 receives output signals of the two-divided photodetectors 31, and generates, as a tracking error signal TE, a difference signal indicating the difference between the received output signals. The digital signal processing circuit 34 receives one of the output signals of the operation circuit 32, and demodulates the received signal into an information signal in digital form. The D/A converter 35 converts the digital signal from the digital signal processing circuit 34 into analog signals. The output terminals 36L and 36R are used for externally outputting the analog signals from the D/A converter 35. The semiconductor driving circuit 40 drives the semiconductor laser 21. The laser output control circuit 39 controls the semiconductor laser driving circuit 40.

The pickup control unit 130 has a tracking drive circuit 37, and a focusing drive circuit 38. The tracking drive circuit 37 receives the tracking error signal TE output from the subtracter 33, and controls a tracking actuator 26 in accordance with the tracking error signal TE. The focusing drive circuit 38 controls a focusing actuator 27 on the basis of a focus error signal FE output from the operation circuit 32.

The system controller 140 controls, on the basis of instructions from the input/display unit 150 and other signals, the digital signal processing circuit 34, the tracking drive circuit 37 and the laser output control circuit 32

Figure 9:
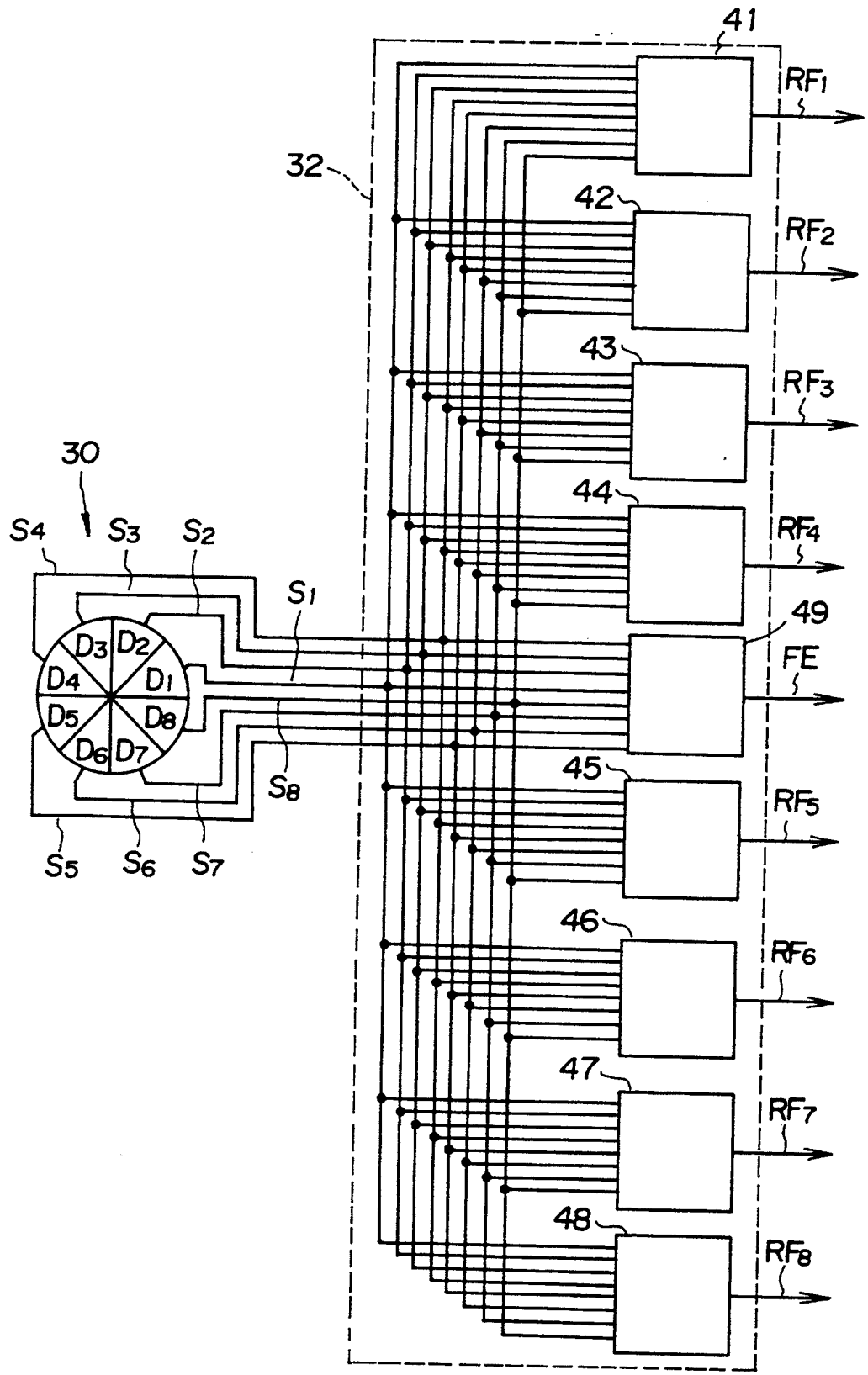
FIG. 9 is a block diagram showing an eight-divided photodetectors and operation circuits used in the second embodiment of the present invention.
Figure 10:
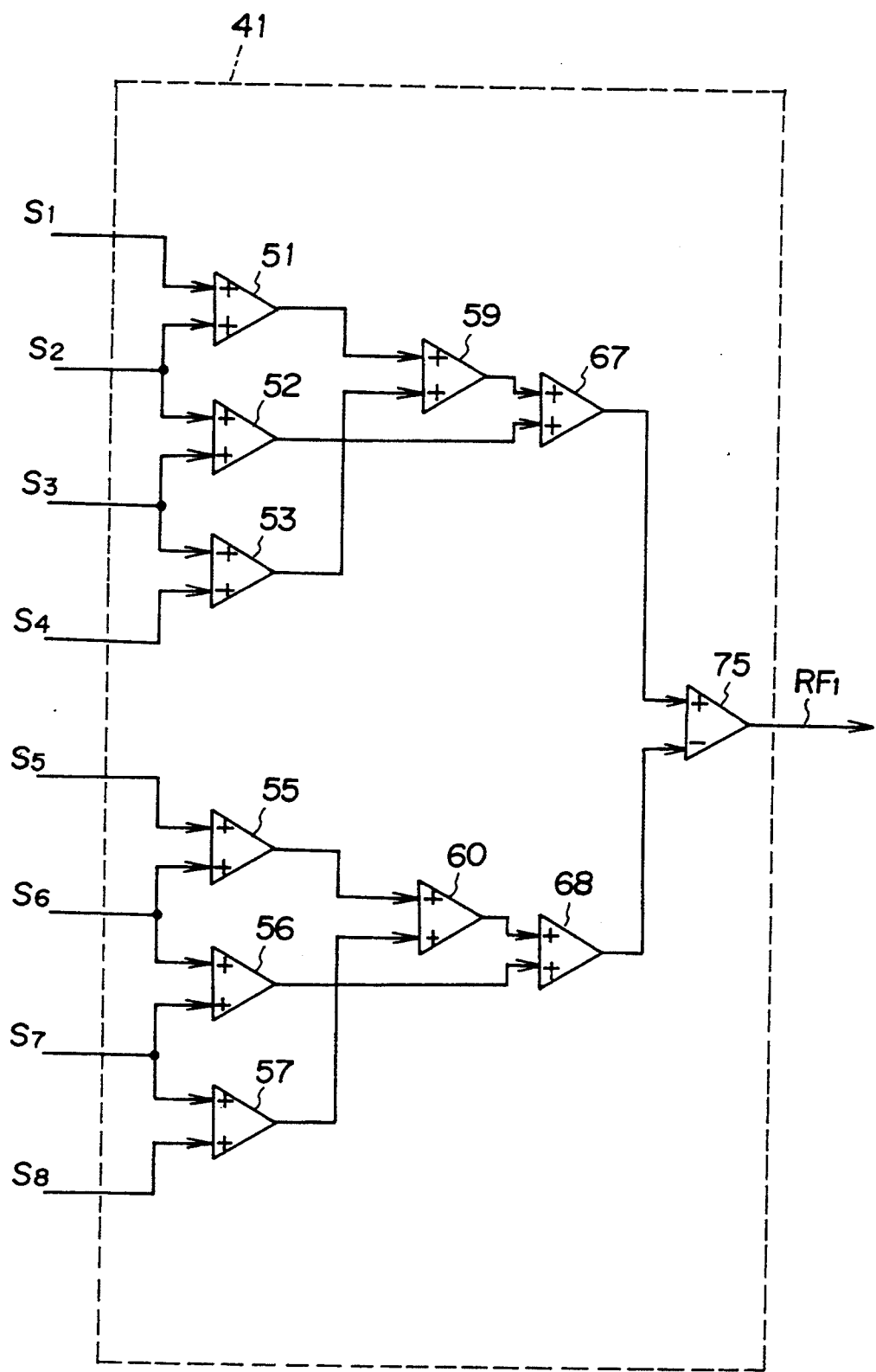
FIG. 10 is a block diagram of an information signal operation unit 41 shown in FIG. 9.
Figure 11:
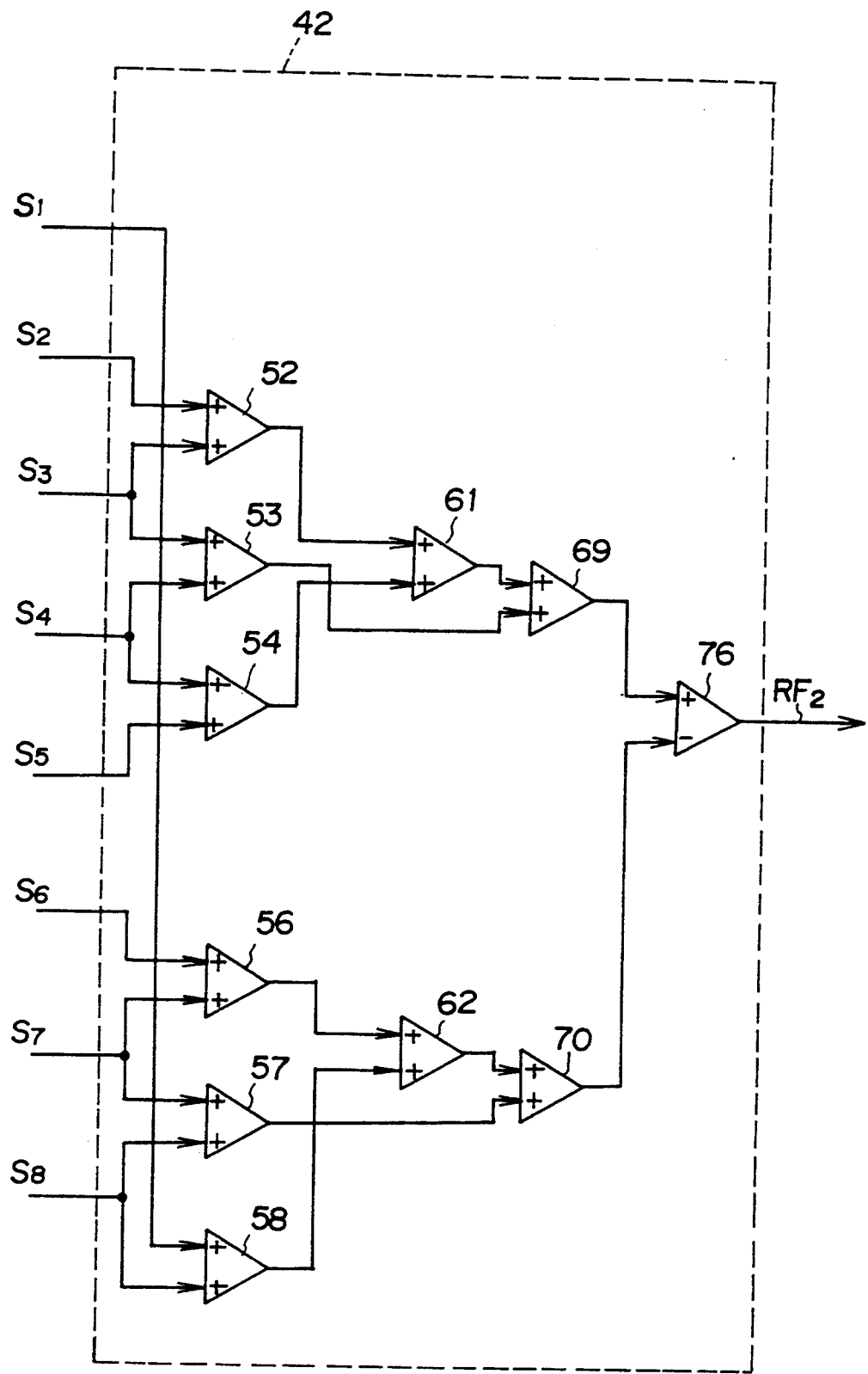
FIG. 11 is a block diagram of an information signal operation unit 42 shown in FIG. 9.
Figure 13:
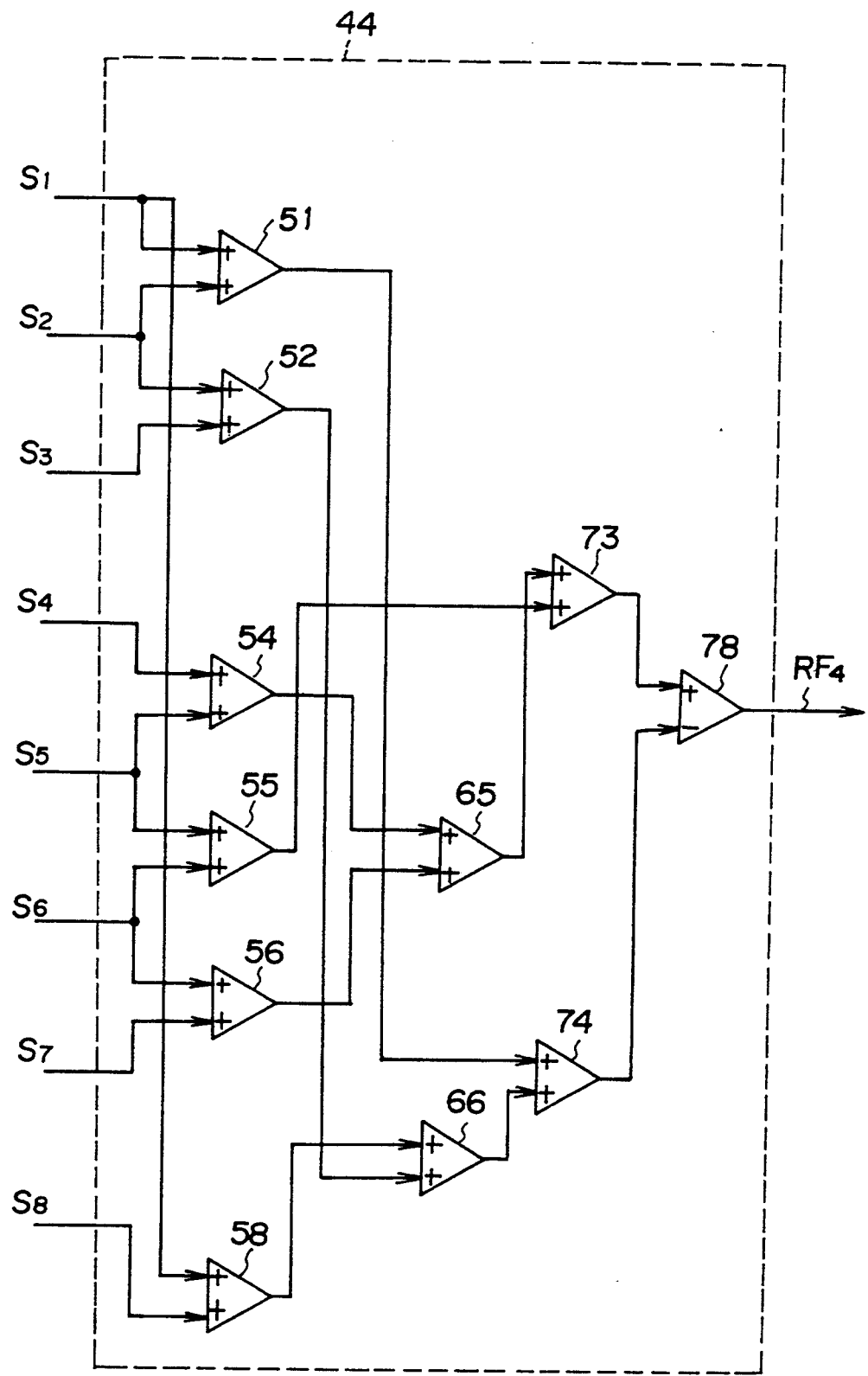
FIG. 13 is a block diagram of an information signal operation unit 44 shown in FIG. 9.
Figure 14:
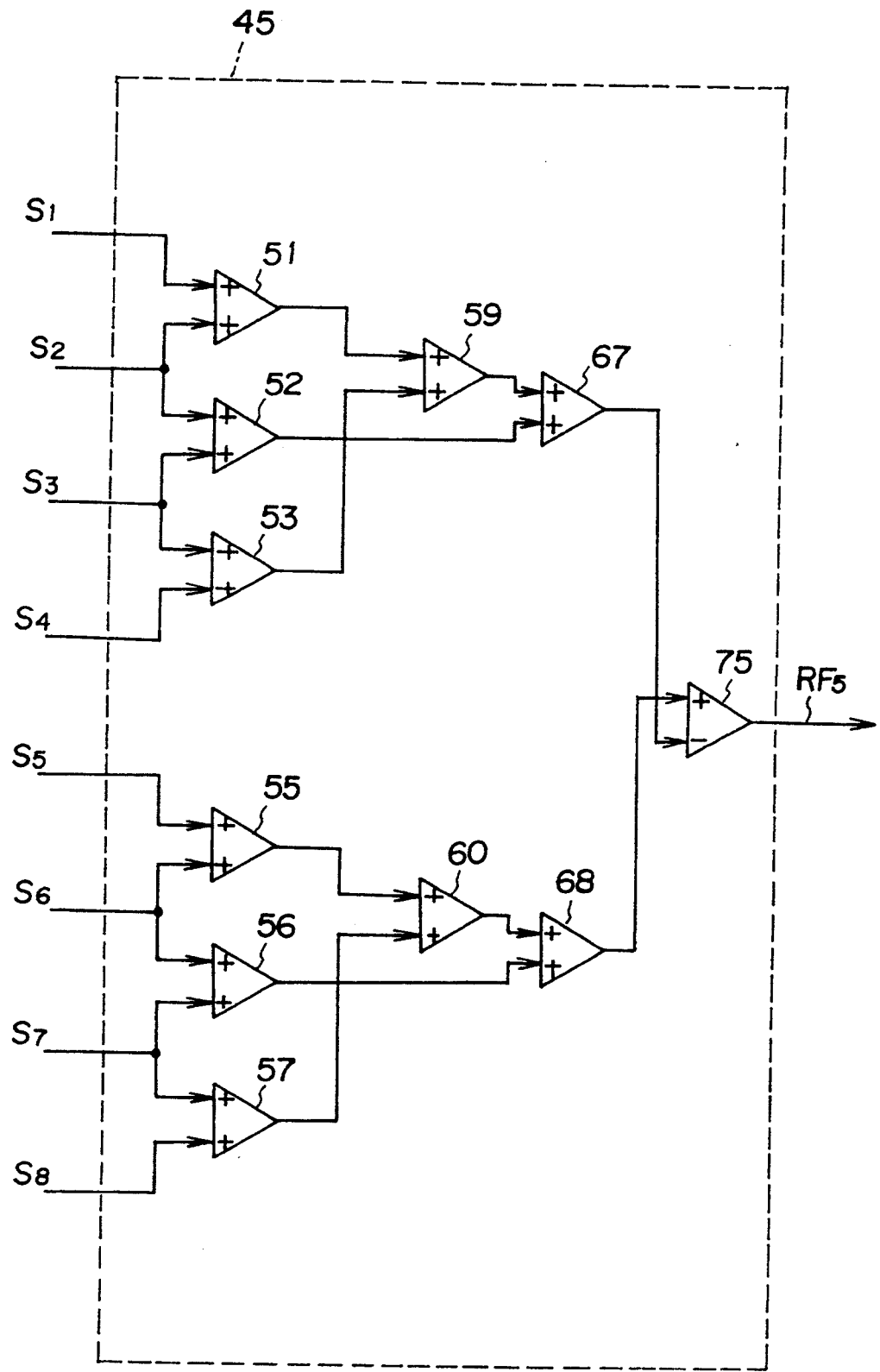
FIG. 14 is a block diagram of an information signal operation unit 45 shown in FIG. 9.
Figure 15:
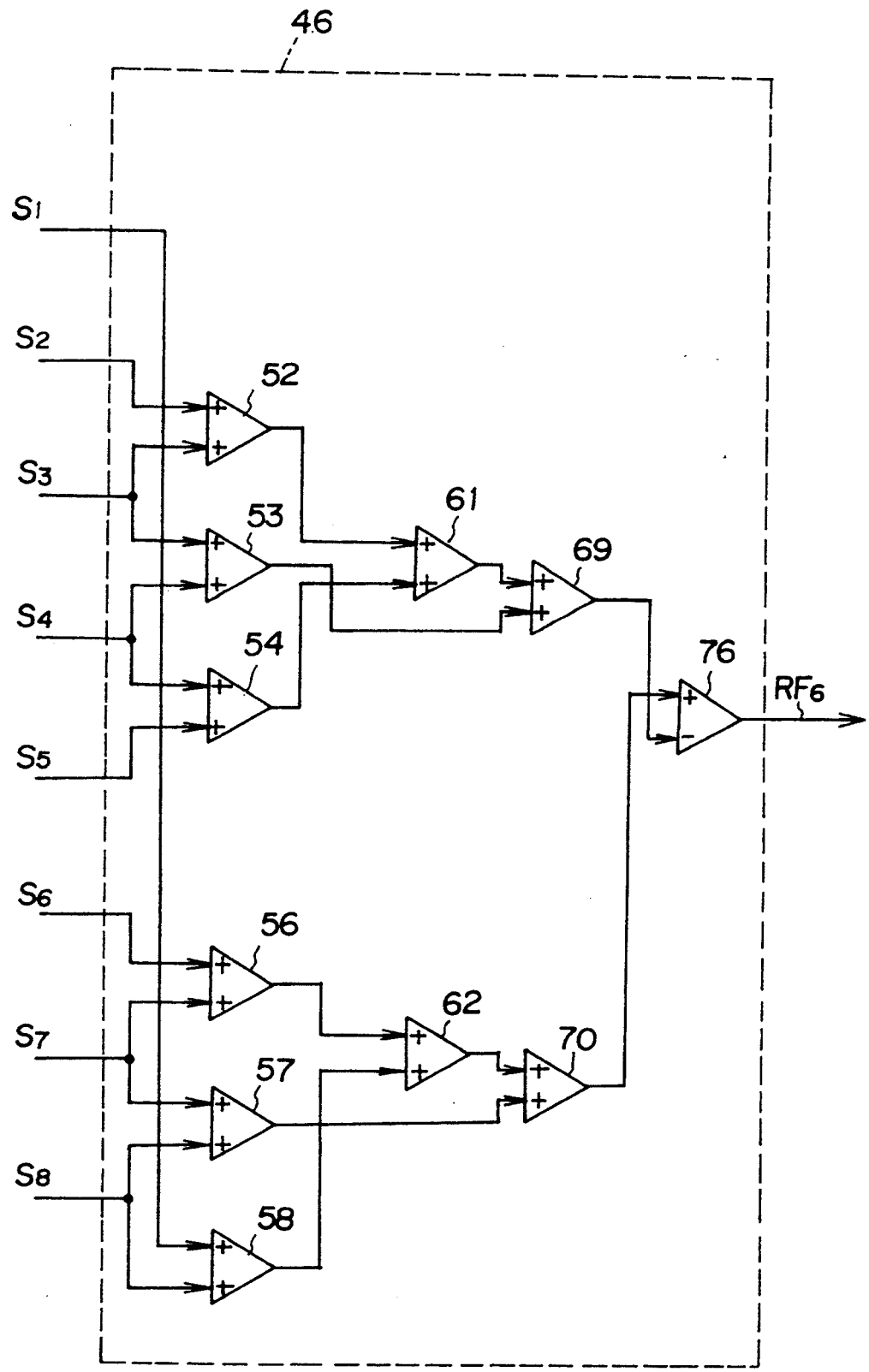
FIG. 15 is a block diagram of an information signal operation unit 46 shown in FIG. 9.
Figure 16:
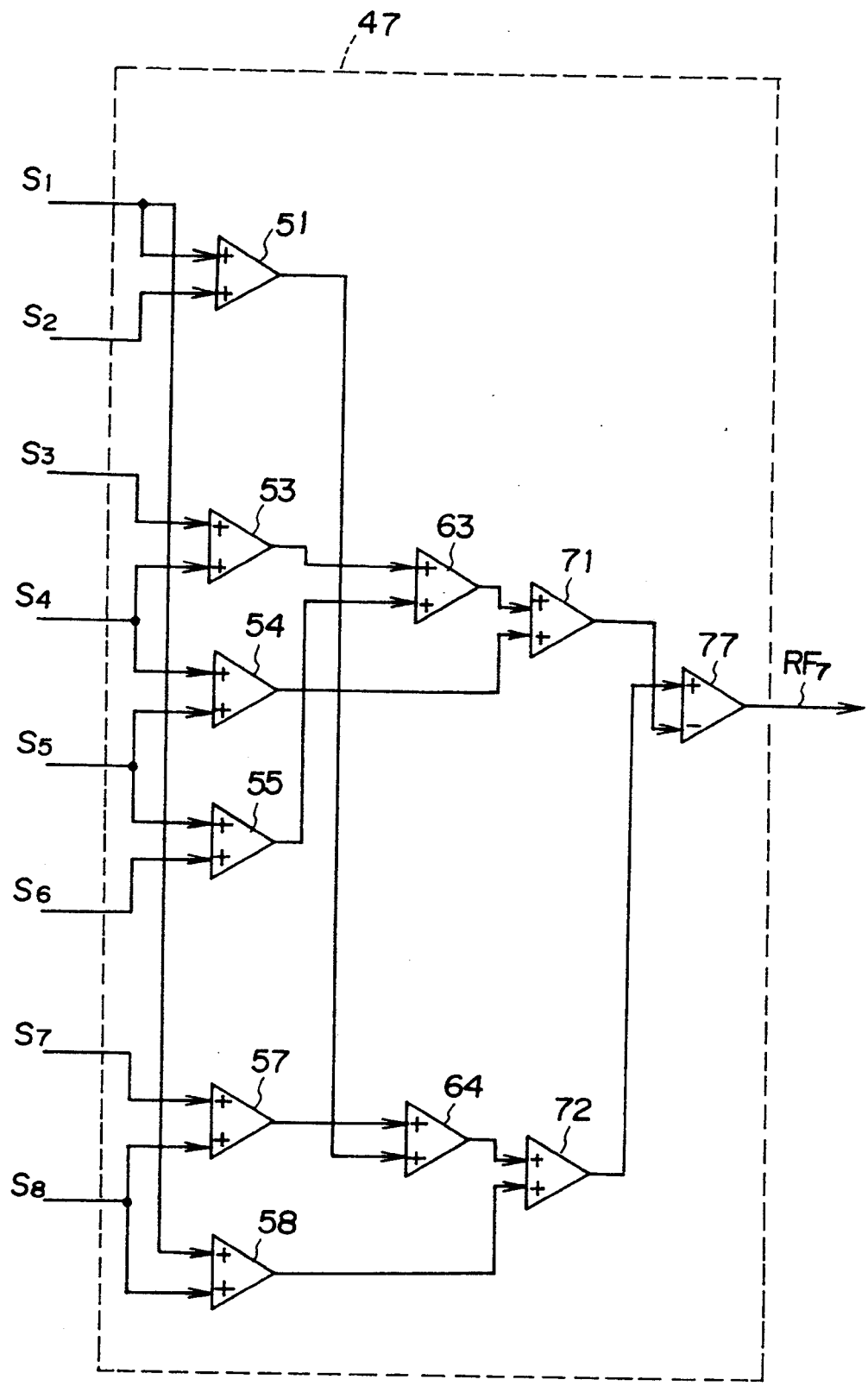
FIG. 16 is a block diagram of an information signal operation unit 47 shown in FIG. 9.
Figure 17:
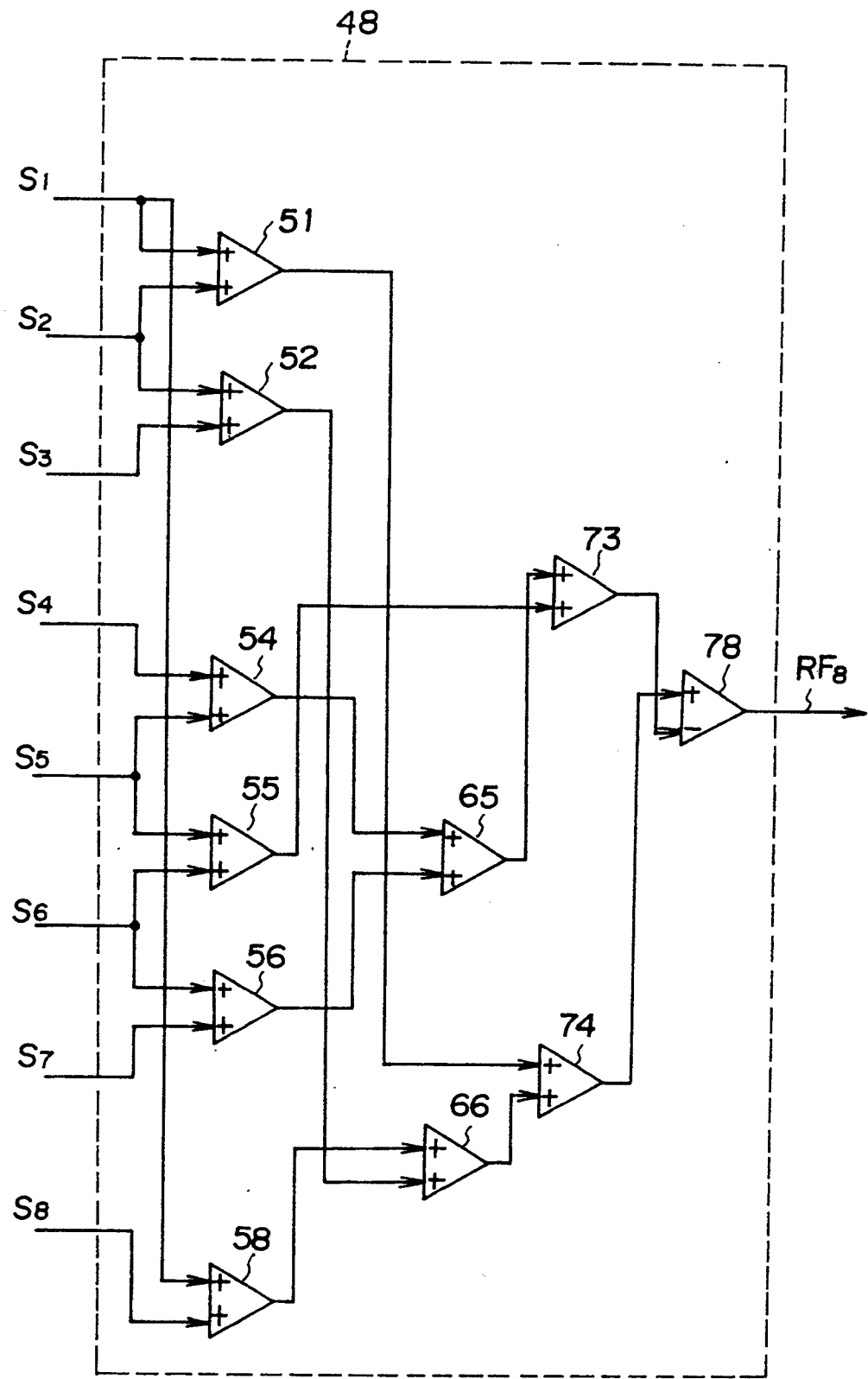
FIG. 17 is a block diagram of an information signal operation unit 48 shown in FIG. 9.

FIG. 9 shows the details of the eight-divided photodetector 30 and the operation circuit 32. As shown in FIG. 9, the eight-divided photodetector 30 includes eight light receiving surfaces D1-D8. The operation circuit includes eight information signal operation units 41-48, and a focus error signal operation unit 49. Information signals RF1-RF8 are respectively output from the information signal operation units 41-48. The focus error signal FE is output from the focus error signal operation unit 49. In this case, one of dividing lines for dividing the entire light receiving surface of the eight-divided photodetector 30 into eight parts extends in parallel with the circular direction of the compact disk 12. The optical system is adjusted so that when the center of the laser beam spot formed by the objective lens 16 is positioned on the center line of a track, the spot of the light reflected by the track is projected onto a center point O of the eight-divided photodetector 30.

Figure 18:
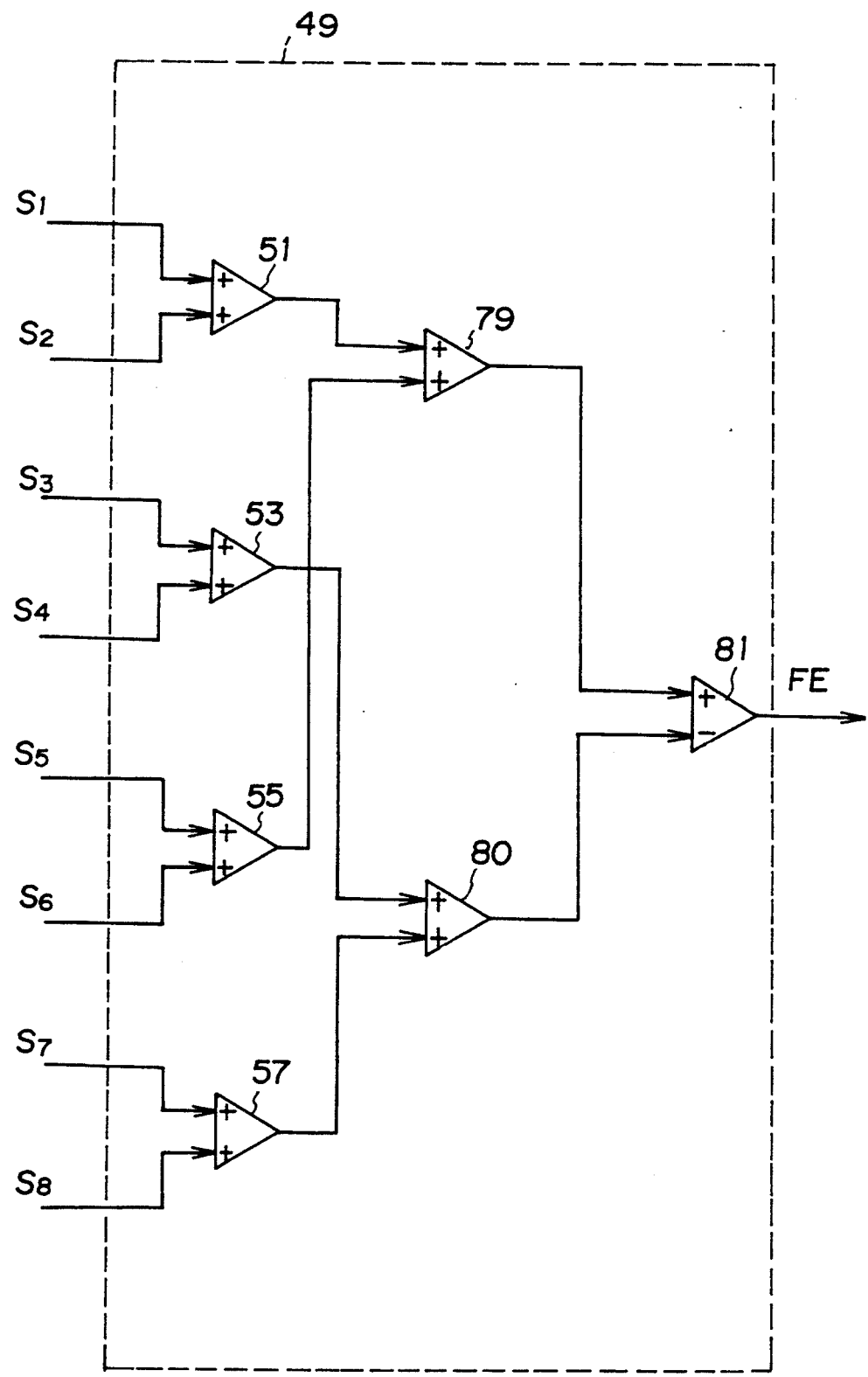
FIG. 18 is a block diagram of a focus error signal operation unit 49 shown in FIG. 9.

FIGS. 10-17 show the details of the information signal operation units 41-48, respectively. FIG. 18 shows the details of the focus error signal operation unit 49. In FIGS. 10-18, reference numbers 51-74 indicates adders, and reference numbers 75-78 indicate subtracters. Reference numbers 79 and 80 indicate adders, and a reference number 81 indicates a subtracter. The light detection signals S1-S8 respectively generated at the light receiving surfaces D1-D8 are applied to the above operation units 41-49, respectively.

The information signal operation unit 41 generates the information signal RF1 expressed as follows:

$$RF1 = S1 + 2 \times S2 + 2 \times S3 + S4 - (S5 + 2 \times S6 + 2 \times S7 + S8) \quad (7).$$

The information signal operation unit 42 generates the information signal RF2 expressed as follows:

$$RF2 = S2 + 2 \times S3 + 2 \times S4 + S5 - (S6 + 2 \times S7 + 2 \times S8 + S1) \quad (8).$$

The information signal operation unit 43 generates the information signal RF3 expressed as follows:

$$RF3 = S3 + 2 \times S4 + 2 \times S5 + S6 - (S7 + 2 \times S8 + 2 \times S1 + S2) \quad (9).$$

The information signal operation unit 44 generates the information signal RF4 expressed as follows:

$$RF4 = S4 + 2 \times S5 + 2 \times S6 + S7 - (S8 + 2 \times S1 + 2 \times S2 + S3) \quad (10).$$

The information signal operation unit 45 generates the information signal RF5 expressed as follows:

$$RF5 = S5 + 2 \times S6 + 2 \times S7 + S8 - (S1 + 2 \times S2 + 2 \times S3 + S4) \quad (11).$$

The information signal operation unit 46 generates the information signal RF6 expressed as follows:

$$RF6 = S6 + 2 \times S7 + 2 \times S8 + S1 - (S2 + 2 \times S3 + 2 \times S4 + S5) \quad (12).$$

The information signal operation unit 47 generates the information signal RF7 expressed as follows:

$$RF7 = S7 + 2 \times S8 + 2 \times S1 + S2 - (S3 + 2 \times S4 + 2 \times S5 + S6) \quad (13).$$

The information signal operation unit 48 generates the information signal RF8 expressed as follows:

$$RF8 = S8 + 2 \times S1 + 2 \times S2 + S3 - (S4 + 2 \times S5 + 2 \times S6 + S7) \quad (14).$$

The focus error signal operation unit 49 generates the focus error signal FE expressed as follows:

$$FE = S1 + S2 + S5 + S6 - (S3 + S4 + S7 + S8) \quad (15).$$

Figure 19:
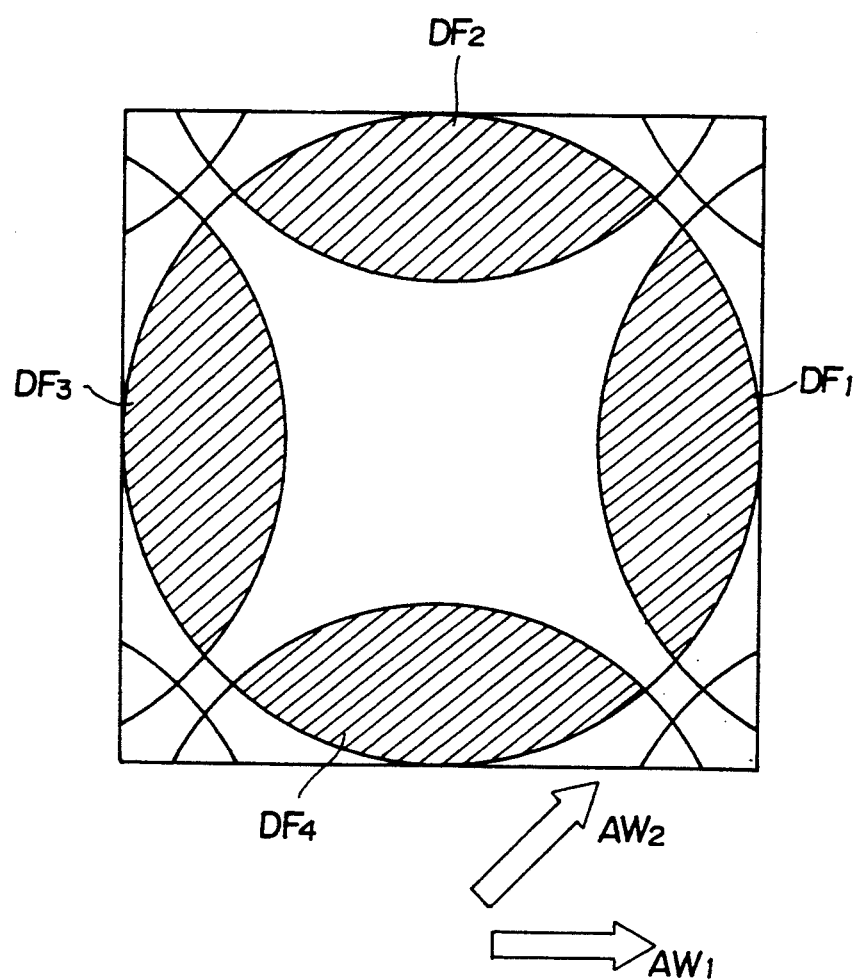
FIG. 19 is a diagram showing light spots formed on information pits and the operation of the first embodiment of the present invention.

A description will now be given, with reference to FIGS. 7, 19 and 20, of the operation when the compact disk 12 of the first embodiment of the present invention is reproduced by the compact disk player of the second embodiment thereof.

The track pitch P (which is also the distance between the adjacent pits arranged side by side in the circular direction of the compact disk 12) shown in FIG. 7 is hereinafter referred to as a unit length. In this case, a pattern formed by the diffracted light as shown in FIG. 19 is obtained by selecting the laser light wavelength $\lambda$ and the numerical aperture NA so that the following condition is satisfied:

$$\tfrac{1}{2} \times \lambda / NA \leq P \quad (16).$$

When the direction of the step (the direction of the slope) coincides with the direction indicated by the arrow AW1, the following relations are obtained:

$$I1 > I2, I4 > I3 \quad (17).$$

where I1-I4 denote light intensities obtained in the diffracted light overlapping areas DF1-DF4, respectively. Hereinafter, "+-sign" directions mean the direction AW1, the direction opposite to the direction AW1, and two directions orthogonal to the direction AW1. When the step direction coincides with the direction indicated by the arrow AW2, the following relations are obtained:

$$I1, I2 > I3, I4 \quad (18).$$

It can be seen from the above that an area on the surface of the eight-divided photodetector 30 does not corresponds to the pit direction angle. Hereinafter, "x-letter" directions mean the direction AW2, the direction opposite to the direction AW2, and two directions orthogonal to the direction AW2. It is impossible to read information from the compact disk 12 by solely utilizing the light detection signals S1-S8 of the eight-divided photodetector 30. That is, it is necessary to perform an operation on the light detecting signals S1-S8 to obtain the pit direction angle from these signals S1-S8.

The above operation will now be described. Now, several operations will be considered. In a first operation, the light detection signals of two adjacent light receiving surfaces of the eight-divided photodetector 30 are added to each other in such a manner that:

S1+S2, S2+S3 . . . .

In the first operation, signals related to the +-sign directions can be detected in accordance with the expressions (17) and (18), while there is a disadvantage in that signals related to the x-letter directions cannot be detected.

In a second operation, the light detection signals of four adjacent light receiving surfaces are added to each other in such a manner that:

S1+S2+S3+S4, S2+S3+S4+S5, . . .

In this case, signals related to the x-letter directions can be detected, while signals related to the +-sign directions cannot be detected.

In a third operation, the sum of the results of the first and second operations is calculated in such a manner that:

S1+2×S2+2×S3+S4, S2+2×S3+2×S4+S5 . . .

In this case, signals in the +-sign and x-letter directions can be detected. However, the SN ratio (Signal-to-Noise ratio) is very small, and an erroneous signal detection may occur.

In a fourth operation, the result of the third operation for four adjacent light receiving surfaces is subtracted from the result of the third operation for the remaining four adjacent light receiving surfaces in such a manner that:

S1+2×S2+2×S3+S4 −(S5+2×S6+2×S7+S8),
S2+2×S3+2×S4+S5
−(S6+2×S7+2×S8+S1), ...

That is, a subtraction operation on the output signals of two light receiving surfaces in the orthogonal direction as shown in FIG. 20, is carried out. In this case, signals in the +-sign and x-letter directions can be detected, and a good SN ratio can be obtained.

Hence, the above-mentioned fourth operation is carried out in each of the information signal operation units 41–48 of the operation circuit 32, and the direction angle of each pit can be identified by the eight output signals of the information signal operation units 41–48. In this manner, information can be reproduced from the compact disk 12.

Figure 21A:
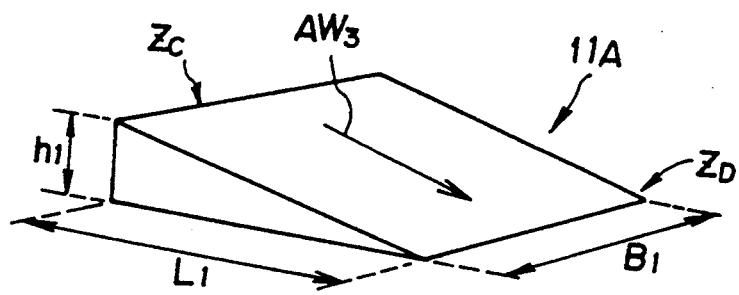
FIGS. 21A and 21B are diagrams showing an information pit according to a third embodiment of the present invention.
Figure 21B:
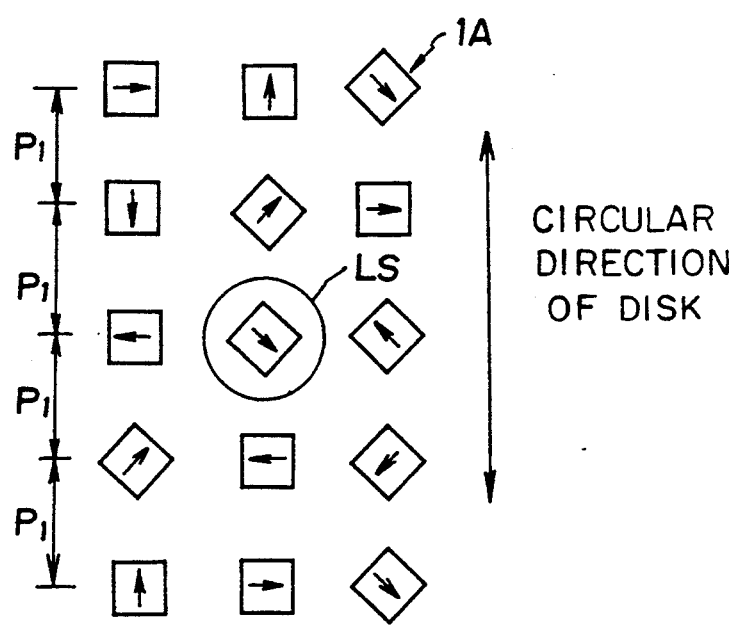

A description will now be given, with reference to FIGS. 21A and 21B, of an information pit having a slope according to a third embodiment of the present invention. In FIG. 21A, B1 denotes the width of an information pit 11A having a rectangular-shaped slope, and L1 denotes the length thereof. Further, h1 denotes the height of the information pit 11A. AW3 indicates the direction of the slope of the information pit 1A, and corresponds to the direction of the step thereof. As shown in FIG. 21B, eight pit direction angles are prescribed by use of a unit angle of 45° as in the case of the aforementioned first embodiment. In FIG. 21A, ZC indicates a high pit portion, and ZD indicates a low pit portion.

Simulation by computation based on the aforementioned Hopkins scaler theory is carried out for the information pit 1A. The signal intensity increases as the pit length L1 or the pit width B1 increases. However, in practice, it is necessary to optically distinguish the pit portion and the flat (land) portion from each other. With the above in mind, the third embodiment of the present invention employs the pit length L1 and the pit width B1 respectively satisfying the following expressions:

$$L1 = (1/\sqrt{2}) \times P \tag{19}$$

$$B1 = (1/\sqrt{2}) \times P. \tag{20}$$

As the pit height h1 changes, the readout signal level changes, but the SN ratio does not change. When the pit height h1 is optimized so that the largest signal level can be obtained, the optimized pit length (optical height) is equal to $(1/5) \times \lambda$, where $\lambda$ is the wavelength of the laser beam. The SN ratio obtained in this case is approximately equal to 2.5 dB in the +-sign directions, and 3.5 dB in the x-letter directions.

When the pit shape and dimensions are optimized in the above manner, the recording density RD of the compact disk is expressed as follows:

$$RD = 3 \times 10^6 / [(1/\sqrt{2}) \times (\lambda/NA)]^2 \text{ (bits/mm}^2\text{)}. \tag{21}$$

When the parameters relating to the currently available optical pickups ($\lambda=0.780$ μm, NA=0.45) are applied to the expression (21), RD=2.0×10$^6$ (bits/mm$^2$).

The recording density of the currently available compact disks is approximately equal to 1.0×10$^6$ (bits/mm$^2$). Hence, the recording density obtained according to the present invention is approximately twice the recording density obtained under the current pickup condition. If the wavelength of the pickup is shortened and the numerical aperture NA is increased in the feature so that $\lambda=0.670$ μm and NA=0.55, for example, then RD=4.0×10$^6$ (bits/mm$^2$) and is approximately four times the currently available recording density.

Figure 22A:
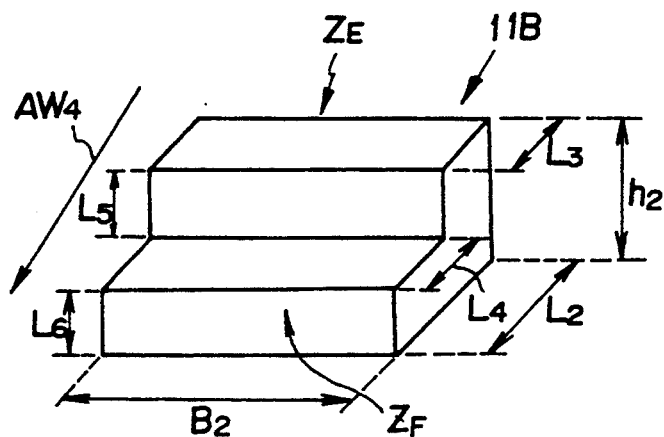
FIGS. 22A and 22B are diagrams showing an information pit according to a fourth embodiment of the present invention.
Figure 22B:
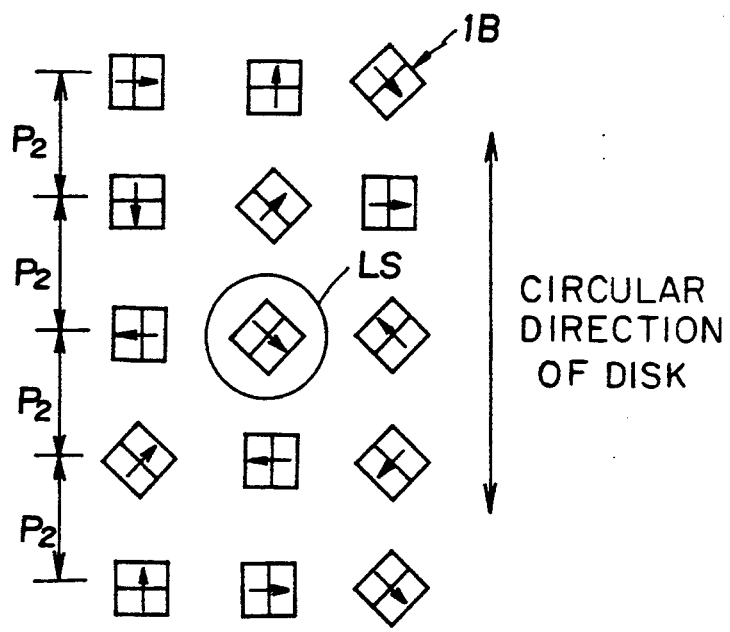

A description will now be given, with reference to FIGS. 22A and 22B, of an information pit having a step according to a fourth embodiment of the present invention. FIG. 22A shows an information pit 11B having a step. In FIG. 22A, B2 denotes the width of the information pit 11B, L2 denotes the length thereof, and h2 denotes the height thereof. The step-like information pit 1B has dimensions L3–L6. AW4 denotes the direction of the step of the information pit 1B. As shown in FIG. 22B, eight pit direction angles are prescribed by use of a unit angle of 45° as in the case of the aforementioned first embodiment. In FIG. 22A, $Z_E$ indicates a high pit portion, and $Z_F$ indicates a low pit portion.

Simulation by computation shows that the pit shape which makes it possible to detect signals is not limited to a slope as in the cases of the first and third embodiments, and that it is sufficient to form a high pit portion and a low pit portion, to form the pit direction angle by the direction of the step (extending from the high pit portion to the low pit portion) and the circular direction of the compact disk.

Figure 23A:
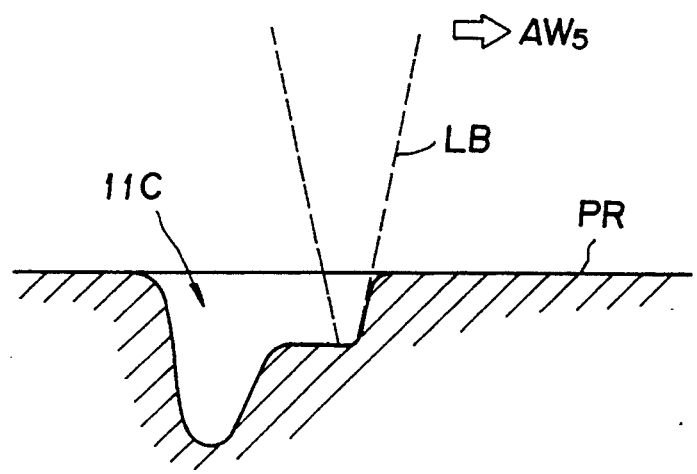
FIGS. 23A and 23B are diagrams showing a process of producing a master ring of the optical disk according to the present invention.
Figure 23B:
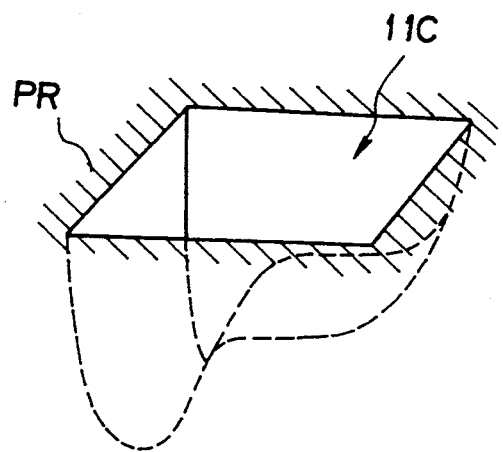

Hence, a master ring (master disk) used for manufacturing compact disks having information pits having the pit shape according to the present invention is produced as shown in FIGS. 23A and 23B. Namely, a laser beam LB which is moved in a direction indicated by arrow AW5 is projected onto a glass original plate on which a photoresist film PR is coated, and then the glass original plate is exposed. By adjusting the depth of an exposed part 11C by the intensity of the laser beam LB, it is possible to form a pit 11C having a step. In this case, the result of simulation by computation shows that the pit signal can be correctly read even when the step does not rise steeply. The relationship among the unit length, pit width and the pit length is the same as that of the third embodiment of the present invention, and thus, the recording density of the fourth embodiment becomes as high as that of the third embodiment.

In the above-mentioned embodiments of the present invention, compact disks are used as optical disks. The present invention includes arbitrary optical disks having pit formats, such as LVDs (Laser Video Disks). The information pits may be projections or recesses with respect to light incident thereon. In the aforementioned embodiments, the direction of the step is the direction from the high pit portion to the low pit portion. Alternatively, the direction of the step may be the direction from the low pit portion to the high pit portion.

According to the present invention, it is possible to reduce the track pitch even under the condition that the currently available wavelength of the laser beam as well as the currently available numerical aperture are used. If the spot size w of the laser beam is diminished by reducing the wavelength $\lambda$ thereof or the numerical aperture NA in the feature, the track pitch will be further reduced, and the recording density will be further enhanced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical disk comprising:
   a substrate of disk shape;
   a recording medium formed on said substrate, and having a recording surface on which a plurality of tracks are formed; and
   information pits formed on the tracks,
   each of said information pits having a first pit portion having a first level from the recording surface and a second pit portion having a second level lower than the first level,
   a pit direction angle indicating an angle between a direction connecting the first pit portion and the second pit portion to each other and a circular direction of said optical disk being equal to one of predetermined equiangular angles around the center of the information pit, the pit direction angle corresponding to recorded information pieces read by projecting a laser beam onto the recording medium.

2. An optical disk as claimed in claim 1, wherein the pit direction angle is equal to one of 0°, 45°, 90°, 135°, 180°, 225°, 270° and 315°.

3. An optical disk as claimed in claim 1, wherein each of the information pits has a slope connecting the first pit portion and the second pit portion to each other.

4. An optical disk as claimed in claim 1, wherein each of the information pits has a step connecting the first pit portion and the second pit portion to each other.

5. An optical disk as claimed in claim 3, wherein said slope has a substantially circular shape.

6. An optical disk as claimed in claim 3, wherein said slope has a substantially rectangular shape.

7. An optical disk as claimed in claim 1, wherein the information pits comprise projections formed on the recording surface.

8. An optical disk as claimed in claim 1, wherein the information pits comprise recesses formed on the recording surface.

9. An optical disk as claimed in claim 1, wherein a track pitch between two adjacent tracks is approximately equal to a distance between two adjacent information pits on an identical track.

10. An optical disk reproducing apparatus for reproducing information from an optical disk comprising: a substrate of disk shape; a recording medium formed on said substrate, and having a recording surface on which a plurality of tracks are formed; and information pits formed on the tracks, wherein each of said information pits has a first pit portion having a first level from the recording surface and a second pit portion having a second level lower than the first level, and a pit direction angle indicating an angle between a direction connecting the first pit portion and the second pit portion to each other and a circular direction of said optical disk is equal to one of predetermined equiangular angles around the center of the information pit, the pit direction angle corresponding to recorded information pieces, said optical disk reproducing apparatus comprising:
   light projection means for projecting a laser beam having a predetermined wavelength onto the recording surface under a condition of a predetermined numerical aperture;
   photodetector means having equiangular light receiving surfaces, for generating light detection signals from a reflected laser beam reflected by the recording surface and incident on the equiangular light receiving surfaces, one of dividing lines for dividing an entire light receiving surface of the photodetector means being substantially parallel to the circular direction of the optical disk;
   an optical system having a light path in which the reflected laser beam projected onto a center line of the track is received in a center portion of the entire light receiving surface;
   operation means, coupled to said photodetector means, for generating information signals as predetermined functions of the light detection signals from said light receiving surfaces; and
   information reproducing means, coupled to said operation means, for reproducing the recorded information pieces from the information signals.

11. An optical disk reproducing apparatus as claimed in claim 10, wherein the pit direction angle of said optical disk is equal to one of 0°, 45°, 90°, 135°, 180°, 225°, 270° and 315°.

12. An optical disk reproducing apparatus as claimed in claim 11, wherein:
   said photodetector means has eight light receiving surfaces;
   said operation means is adapted to generate information signals $RF_n$ in accordance with the following expression:

$$RF_n = S_n + 2 \times S_{n+1} + 2 \times S_{n+2} + S_{n+3} - (S_{n+4} + 2 \times S_{n+5} + 2 \times S_{n+6} + S_{n+7})$$

where $S_n (n=1, 2, \ldots, 8)$ denotes one of the light detection signals from an nth light receiving surface of said eight light receiving surfaces; and
   said information reproducing means is adapted to reproduce the information recorded on said optical disk from the information signals $RF_n$.

13. An optical disk reproducing apparatus as claimed in claim 12, wherein said information reproducing means comprises means for specifying the pit direction angles from the information signals $RF_n$ and for reproducing information from specified pit direction angles.

* * * * *